(12) United States Patent
Zhang et al.

(10) Patent No.: US 8,411,913 B2
(45) Date of Patent: Apr. 2, 2013

(54) PARTIAL FINGERPRINT RECOGNITION

(75) Inventors: David Zhang, Hong Kong (HK); Qijun Zhao, Hong Kong (HK); Nan Luo, Hong Kong (HK); Guangming Lu, Hong Kong (HK)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 921 days.

(21) Appl. No.: 12/485,056

(22) Filed: Jun. 16, 2009

(65) Prior Publication Data

US 2009/0310831 A1 Dec. 17, 2009

Related U.S. Application Data

(60) Provisional application No. 61/073,032, filed on Jun. 17, 2008.

(51) Int. Cl.
*G06K 9/00* (2006.01)
(52) U.S. Cl. .................................... 382/125
(58) Field of Classification Search .......... 382/115, 382/151, 124–125, 190, 209, 218, 276, 294; 340/5.52, 5.53, 5.81, 5.82, 5.83; 713/186; 902/3
See application file for complete search history.

(56) References Cited

U.S. PATENT DOCUMENTS

| | | | |
|---|---|---|---|
| 5,717,777 | A | 2/1998 | Wong et al. |
| 6,041,133 | A | 3/2000 | Califano et al. |
| 6,097,035 | A | 8/2000 | Belongie et al. |
| 6,314,197 | B1 | 11/2001 | Jain et al. |
| 6,411,728 | B1 | 6/2002 | Lee et al. |
| 6,763,127 | B1 | 7/2004 | Lin et al. |
| 7,190,816 | B2 | 3/2007 | Mitsuyu et al. |
| 2007/0230754 | A1 | 10/2007 | Jain et al. |
| 2010/0266168 | A1* | 10/2010 | Wang et al. .......... 382/124 |

OTHER PUBLICATIONS

Morier (Automatic Extraction of Level 2 and Level 3 Features for Fragmentary Fingerprint Comparison), pp. 1-42, Feb. 20, 2004.*
Ross, et al. (A Hybrid Fingerprint Matcher), Michigan State University, pp. 1661-1673, 2003.*
Krzysztof M. Kryszczuk, Patrice Morier, Andrzej Drygajlo, Study of the Distinctiveness of Level 2 and Level 3 Features in Fragmentary Fingerprint Comparison, BioAW 2004, LNCS 3087, pp. 124-133, 2004.
Tsai-Yang Jea, Venu Govindaraju, A minutia-based partial fingerprint recognition system, Pattern Recognition 38 (2005) 1672-1684.
Andrea R. Roddy, MBMBER, IEEE, and Jonathan D. Stosz, Fingerprint Features—Statistical Analysis and System Performance Estimates, Proceedings of the IEEE, vol. 85, No. 9, Sep. 1997.
Anil K. Jain, Fellow, IEEE, Yi Chen, Student Member, IEEE, and Meltem Demirkus, Student Member, IEEE, Pores and Ridges: High-Resolution Fingerprint Matching Using Level 3 Features, IEEE Transactions on Pattern Analysis and Machine Intelligence, vol. 29, No. 1, Jan. 2007.
Neil Yager, ADNAN ADMIN, Fingerprint alignment using a two stage optimization, Pattern Recognition Letters 27 (2006) 317-324.
Lifeng Liu, Tianzi Jiang, Jianwei Yang, and Chaozhe Zhu, Fingerprint Registration by Maximization of Mutual Information, IEEE Transactions on Image Processing, vol. 15, May 5, 2006.
Michael Ray, Peter Meenen, Reza Adhami, A Novel Approach to Fingerprint ore Extraction, 2005 IEEE.
Xinjian Chen, Jie Tian, Senior Member, IEEE, Xin Yang, a New Algorithm for Distorted Fingerprints Matching Based on Normalized Fuzzy Similarity Measure, IEEE Transactions on Image Processing, vol. 15, No. 3, Mar. 2006.

* cited by examiner

*Primary Examiner* — Daniel Mariam
(74) *Attorney, Agent, or Firm* — The Hong Kong Polytechnic University

(57) ABSTRACT

A method for partial fingerprint recognition, the method comprising the steps of extracting features including ridge orientations, valley images, minutiae, and pores from at least two fingerprint fragments, aligning the fingerprint fragments, matching the pores and minutiae on the fingerprint fragments after applying estimated alignment transformation, calculating a final matching score based on a pore matching score and a minutiae matching score, identifying a person based on a result of the final matching score.

10 Claims, 17 Drawing Sheets

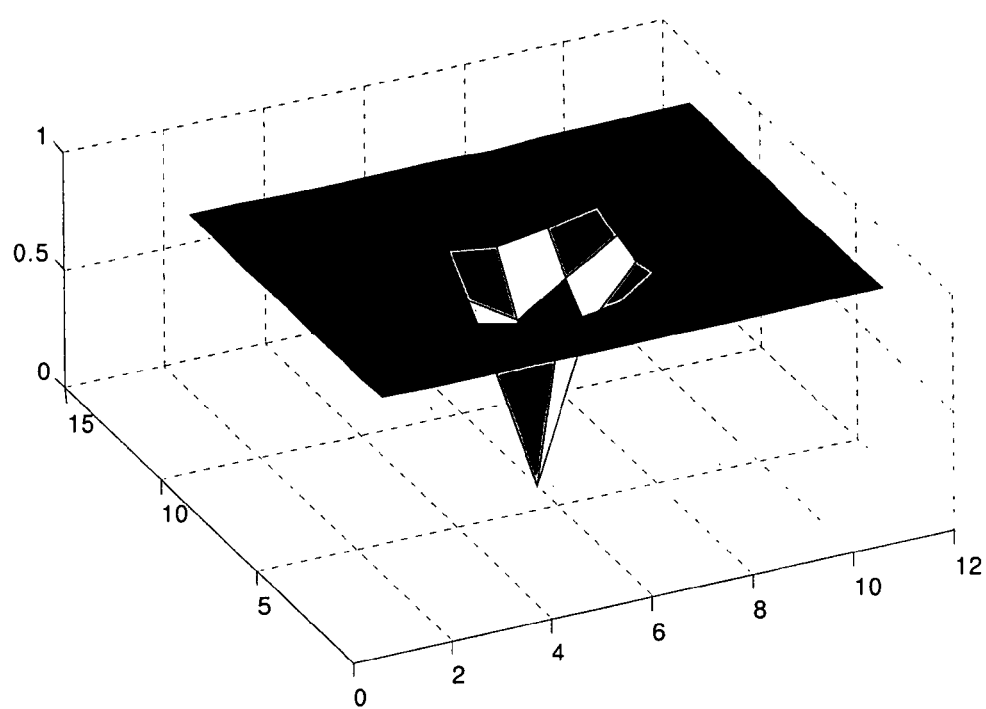
FIG. 2a   --Prior Art--
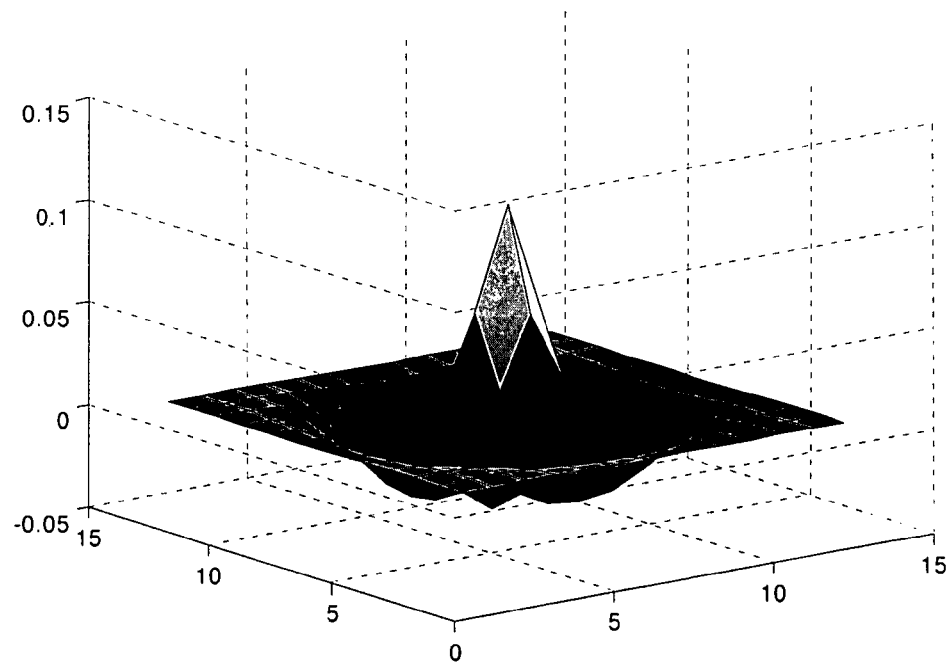
FIG. 2b   --Prior Art--

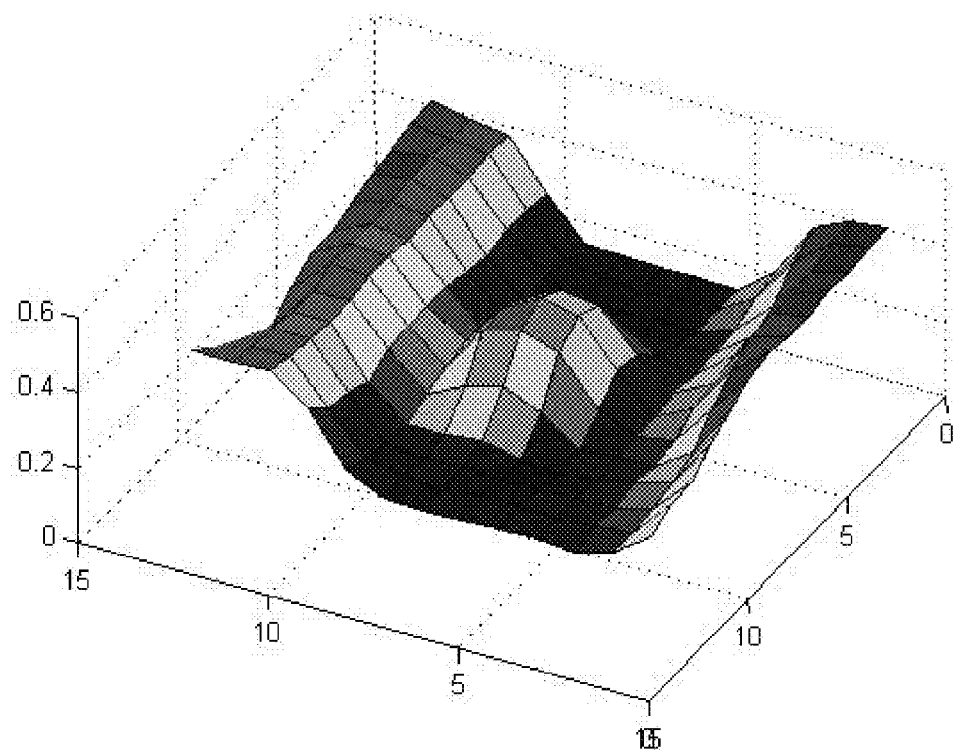
FIG. 3a   --Prior Art--
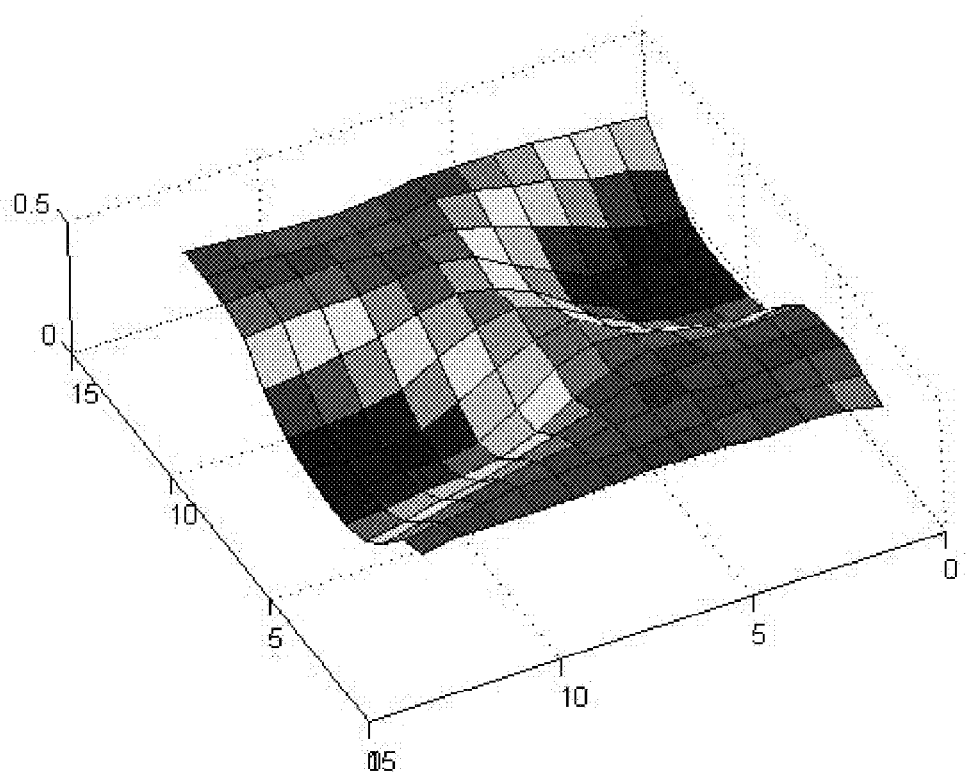
FIG. 3b   --Prior Art--

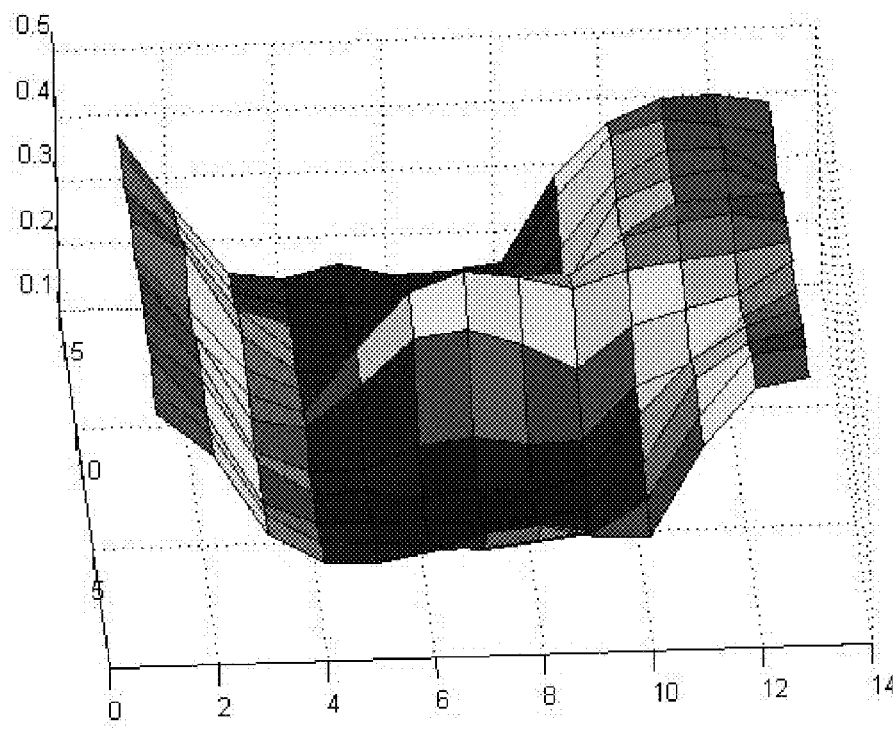
FIG. 3c    --Prior Art--
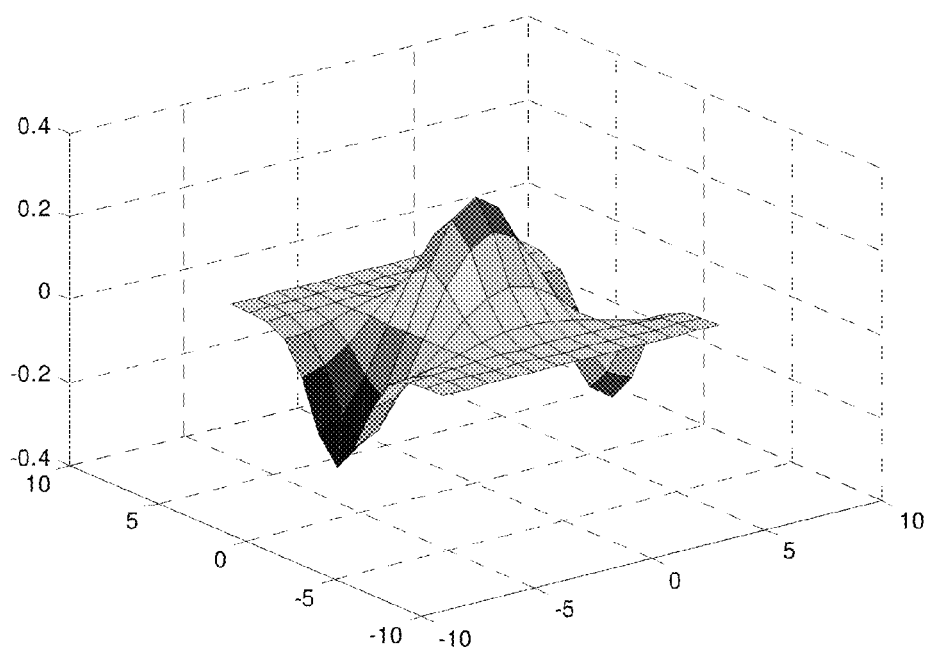
FIG. 3d    --Prior Art--

PARTIAL FINGERPRINT RECOGNITION

CROSS REFERENCE TO RELATED APPLICATION

The present application claims priority from U.S. Provisional Patent Application No. 61/073,032 filed on Jun. 17, 2008, which is hereby incorporated by reference herein in its entirety.

BACKGROUND OF THE INVENTION

1. Field of the Invention

The present invention relates to a method of fingerprint recognition, more particularly, relates to partial fingerprint recognition using minutiae and pores information.

2. Description of the Related Art

Forensic experts have used fingerprints to identify persons for more than one hundred years. They compare latent fingerprints collected from crime scenes (usually partial fingerprints) with the prints taken from suspects (could be either full or partial fingerprints). When examining fingerprints, an expert usually makes use of the so-called minutia features such as endings and bifurcations of ridges on them. More often than not, some other features, for example sweat pores on fingers, are also employed by forensic experts to infer the fingerprints' identities, especially when only small fingerprints are available.

Besides forensic applications, fingerprints are nowadays widely used in various civil applications such as access and attendance control thanks to the fast development of automatic fingerprint recognition techniques. A notable trend in this field is that a small fingerprint sensing area is becoming more and more preferred. This is not only because it can reduce the manufacturing cost, but also because it can make the system more portable.

With such sensors, only small fingerprint regions can be captured on the obtained fragmentary fingerprint images. Therefore, it is highly necessary to exploit novel features and to develop new methods suitable for partial fingerprint recognition.

As one of the oldest and most widely used biometric traits, lots of techniques have been proposed in the prior art using fingerprints to identify individuals and lots of fingerprint related patents have been issued around the world. Among these techniques and patents, most are for recognizing full fingerprints or fingerprint images covering large fingerprint areas. Other techniques for fingerprint recognition include matching input fragmentary (or partial) fingerprints with full (large area) template fingerprints. When small area sensors are used, full template fingerprints are constructed from a number of partial fingerprint images captured during enrollment. When an input fragmentary fingerprint image is given, it will be compared with the constructed full template fingerprints to do authentication. However, for one thing, it is expensive to collect sufficient fingerprint fragments to construct a reliable fingerprint template. For another, errors (e.g. spurious features) could be introduced in the construction process. In addition, all these methods are mainly based on minutiae, which could be very few on small partial fingerprint images. Consequently, it is very possible for them to result in incorrect matches because of insufficient minutiae, or sometimes they are even not applicable for some partial fingerprints when there are no minutiae on them.

Fingerprint alignment is a vital step in fingerprint recognition. The problem of fingerprint alignment or registration originates from that one fingerprint image is often captured at a pose different from previous ones, for example some translation, rotation, or non-rigid deformation could occur between different prints. The goal of fingerprint alignment is thus to retrieve the transformation parameters between fingerprint images and remove the transformation between them. Although non-rigid deformation or distortion could happen in capturing fingerprint images, it is very costly to model and remedy such distortion in fingerprint registration and it can be compensated to some extent in subsequent fingerprint matching. For this sake, the majority of existing fingerprint alignment methods in the literature merely considers translation and rotation though some deformable models have been proposed. And it has been shown that considering only translation and rotation already works well in most cases.

Given two fingerprint images and a setting of transformation parameters, the most intuitive way to evaluate the given transformation is to apply the transformation to one fingerprint image (or selective regions on it) and then calculate the correlation between the transformed fingerprint and the other one. The higher the correlation is, the better the transformation. Using this method, one has to search in the parameter space and find the setting which gives the highest correlation. Such method has also been used by "*Study of the Distinctiveness of Level 2 and Level 3 Features in Fragmentary Fingerprint Comparison*", Kryszczuk et al., to align high resolution fingerprint fragments with full fingerprint templates. This correlation based approach is often time consuming and its accuracy is highly dependent on the way the parameter space is quantized.

The most widely used alignment methods are based on minutiae. Their basic idea is to search in the transformation parameter space and find the optimal transformation which allows the maximum number of minutiae to be matched. One representative kind of approaches uses the idea of Hough transform. These methods discretize the transformation parameters (including translation, rotation and scaling) into finite sets of values and then accumulate evidences for possible transformations by checking each minutia on the fingerprints. The transformation obtaining the most evidence is the best alignment transformation for the fingerprints. One disadvantage of these methods is that the discretization leads to inaccuracy in the transformation estimation. Other methods avoid such discretization, but first determine the correspondences between minutiae and then estimate the transformation based on the corresponding minutiae. The minutia correspondences can be determined by simply taking a brute force approach to examine all possible correspondences between minutiae. From each two corresponding minutiae, a transformation is estimated based on their locations and directions and it is then applied to all other minutiae on one fingerprint. The transformed minutiae are compared with the minutiae on the other fingerprint. If both the locations and directions of two minutiae do not differ much (i.e. within a tolerance), they are matched. The transformation which leads to the largest number of matched minutiae is taken as the best alignment transformation for the two fingerprints. To make the obtained minutia correspondences more accurate, many other supplementary features have been exploited in matching minutiae. These features include ridge information associated with minutiae, orientation fields surrounding minutiae, the geometrical relationship between minutiae and their neighboring minutiae, etc. These minutia-based methods perform very well on images covering large fingerprint regions where sufficient minutiae are presented.

Other efforts have been made to employ minutiae to align fingerprint fragments to full fingerprint templates, as disclosed in "*A Minutia-based Partial Fingerprint Recognition System*, by Jea et al. Unfortunately, when fragmentary fingerprints with small fingerprint regions are given, it would be very possibly that no sufficient minutiae are available. As a result, all these methods will fail. Therefore, some other features rather than minutiae are needed. Besides minutiae, core points and points of maximum curvature of the concave ridges have also been used to align fingerprints. However, these points are vaguely defined and difficult to be accurately extracted. Moreover, they could be very likely not captured on small fingerprint fragments and some fingerprints (e.g. plain arches) do not have such points at all. Hence, they are not proper for fragmentary fingerprint alignment too.

Some other non-minutiae based alignment methods have been recently proposed by Yager and Amin "*Fingerprint Alignment Using a Two Stage Optimization*". The method utilized the orientation fields on fingerprints and searched in transformation parameter space for the optimum one which can make the orientation fields match best. To guide the search, they defined a cost function which measures the difference between elements in the common area of two orientation fields. They presented three different approaches to search in the parameter space while minimizing the cost function. One of these three methods, namely steepest descent, starts from an initial estimate and gradually approaches to the local minimum on the cost surface. This method was proved to be most effectively in the authors' experiments. An important advantage of such orientation field based alignment methods is that the orientation fields can be reliably extracted even from fingerprint images of poor quality and they are robust to nonlinear deformation. One potential problem, however, is that these methods prefer solutions which correspond to smaller overlap between orientation fields and thus might converge to wrong solutions. Therefore, they need to set a minimum amount of overlap between fingerprints.

Liu et al., "*Fingerprint Registration by Maximization of Mutual Information*," proposed another orientation field based fingerprint alignment method by maximizing the mutual information between orientation fields. It is worth attention that these orientation field based methods are more appropriate for coarse alignment and some further fine tuning of the transformation parameters is necessary. Besides, they require quantizing the transformation parameter space and are thus limited in the estimation accuracy.

Some patents have been issued on fingerprint image alignment methods, such as patents to U.S. Pat. No. 5,717,777 (Wong et al.), U.S. Pat. No. 6,041,133 (Califano et al.), and U.S. Pat. No. 6,314,197 (Jain et al.). The method of Wong et al. requires to define a core region, which could be however unfeasible on partial fingerprints. All the methods in the other two patents are based on minutia features. As discussed before, they are unsuitable for aligning two fingerprint fragments too.

To summarize, alignment of full fingerprints is a well-studied problem. Notwithstanding, existing alignment methods are still limited in their accuracy of alignment transformation estimation due to quantization of transformation parameters or not proper for fragmentary fingerprints because of insufficient features available for them on the small fingerprint fragments. Recent development in automatic fingerprint recognition system (AFRS), however, shows that people have increasing interests on small fingerprint sensors. In addition, the continuing need of law enforcement also requires solutions for fragmentary fingerprint recognition. Some other authors have studied the problem of matching fragmentary fingerprints to full fingerprint templates. All of them still employ minutiae as the features to align fingerprints. This is obviously problematic especially when fingerprint templates are also not complete.

Considering the case of using small sized fingerprint sensors, it is expensive to collect full fingerprint templates or to construct full fingerprint templates from partial fingerprints in enrollment. In forensic cases, it is possible that no full fingerprint templates are available. As a result, these methods will not be applicable. Therefore, to align fragmentary fingerprints, new features and new methods have to be exploited and devised.

Pores, as kind of fine fingerprint ridge features, have been recently explored in automatic fingerprint recognition with the aid of high resolution ($\geq 1000$ dpi) imaging techniques. They either statistically or experimentally prove the distinctiveness of pores and the effectiveness of pores in identifying persons. Among these studies, (Kryszczuk et al.) investigated the effect of pores in matching fragmentary fingerprints and they concluded that pores become more useful as the fragment size as well as the number of minutiae decreases. In their study, they did not discuss more about the alignment problem, but simply used a correlation based method. Stosz and Alyea, "*Automated System for Fingerprint Authentication Using Pores and Ridge Structure*", proposed the first high resolution automatic fingerprint recognition system (AFRS) which uses both minutiae and pores. In their system, however, some regions have to be manually located to align fingerprints. More recently, (Jain et al.) proposed to use the features from level 1 to level 3 (i.e. orientation fields, minutiae, pores and ridge contours) in high resolution fingerprints for identification. The alignment of fingerprints in their method is based on minutiae. Note that both of the above two methods work with a large fingerprint region. These studies demonstrate that pores are very distinctive features on fingerprints and even the pores on a very small fingerprint area can distinguish persons. Some patents have also been issued which employ pores in the fingerprint recognition. The method disclosed in U.S. Pat. No. 6,411,728 (Lee et al.) extracts pores from normal low resolution (e.g. 500 dpi) fingerprint images. However, this is arguable because in recent FBI standard regarding Level 3 features the minimum resolution for reliable pore extraction is 1000 dpi. In the U.S. Published Application No. 20070230754 (Jain et al.), instead, 1000 dpi fingerprint images are used and features from level 1 to level 3 are used together in either a parallel or a hierarchical way to recognize fingerprints.

Extraction of pores is surely an important step in the fingerprint recognition systems that use pores. Sweat pores reside on finger ridges, being either open or closed. An open pore is perspiring and appears on fingerprint images as a bright blob connected with the bright valley, whereas a closed pore appears as an isolated bright blob on the dark ridge (refer to FIG. 1). To the best of the inventors' knowledge, the first pore extraction method, proposed by Stosz and Alyea, binarizes and skeletonizes the fingerprint image. A pore is detected once some criteria are met while tracking the skeleton. This skeletonization-based method was later used in Lee et al. However, skeletonization is computationally expensive and very sensitive to noise. It can work well only on very high resolution fingerprint images, e.g. the fingerprint images used in Kryszczuk et al. were at least 2000 dpi. Recently, Ray et al. "A Novel Approach to Fingerprint Pore Extraction"

proposed an approach to extracting pores from 500 dpi fingerprint images using a pore model (refer to FIG. 2(a)), which is a slightly modified 2-dimensional Gaussian function:

$$M(i, j) = 1 - e^{-\sqrt{i^2+j^2}} \quad (1)$$

Pores are found by locating local areas that can match to the pore model with minimum squared errors. This method uses a filter of universal scale to detect pores. However, it is hard, if not impossible, to find a universal scale suitable to all pores. Moreover, the pore model (1) is isotropic. Very recently, Jain et al. proposed to use the following Mexican hat wavelet transform to extract pores based on their observation that pore regions typically have high negative frequency response as intensity values change abruptly from bright to dark at the pores:

$$w(s, a, b) = \frac{1}{\sqrt{s}} \int\int_{R^2} f(x, y) \phi\left(\frac{x-a}{s}, \frac{y-b}{s}\right) dx dy \quad (2)$$

The scale s in this pore model is experimentally set with a specific dataset. FIG. 2(b) (Jain's pore model) shows the shape of the Mexican hat wavelet. Obviously, it is isotropic. This pore model is also limited by that the pore extractor cannot adapt itself to different fingerprints or different regions on a fingerprint. Almost all existing pore extraction methods use some a priori knowledge to post-process the pore extraction results. For example, both Jain et al. and Ray et al suggest using the ridges as a mask to filter out spurious pores. In jain at al., the sizes of true pores are constrained to be within a range.

In practical fingerprint recognition systems, either fingerprints of different fingers or fingerprints of the same finger could have ridges/valleys and pores of very different widths and sizes. Such problems become even worse when using high resolution fingerprint scanners. From the example fingerprint images shown in FIG. 1, one can easily see the variations in ridge/valley widths and pore sizes over different fingerprint images as well as across the same fingerprint. Besides, by manually marking and cropping hundreds of pores in several fingerprint images, including both open and closed pores, three types of representative pore structures can be summarized as shown in FIG. 3(a-c). Among them, the last two types correspond to open pores and they are not isotropic. Therefore, the pore models used in Jain et al. and Ray et al are not accurate. To conclude, more accurate and adaptive pore models are needed for precise pore extraction from fingerprint images.

SUMMARY OF THE INVENTION

According to an aspect of the present invention, a method for partial fingerprint recognition, the method comprising the steps of extracting features including ridge orientations, valley images, minutiae, and pores from at least two fingerprint fragments, aligning the fingerprint fragments, matching the pores and minutiae on the fingerprint fragments after applying estimated alignment transformation, calculating a final matching score based on a pore matching score and a minutiae matching score, identifying a person based on a result of the final matching score.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2(a) illustrates Ray's pore model.

FIG. 2(b) illustrates Jain's pore model.

FIGS. 3 (a)-(c) are three representative types of pore appearance, corresponding to the pores marked in FIG. 1; (d) is an example adaptive pore model of zero degree

DESCRIPTION OF THE EMBODIMENTS

The accompanying drawings, which are incorporated in and constitute a part of the specification, illustrate embodiments of the invention and, together with the description, serve to explain the principles of the invention.

This invention details a new method for partial fingerprint recognition utilizing pores to align fingerprint fragments and ascertaining the decision from the complimentary information extracted from the minutiae and pores. The fingerprint pores are extracted from the acquired images using a new approach that includes steps of adaptive pore modeling and a filter based effective method for the pore localization. Pore-Valley Descriptors (PVD) are used to represent the pore features based on their locations on ridges, their orientations, and the ridge orientation field and valley structures in their neighborhoods. In order to match two fingerprints, corresponding pores are firstly detected between them according to their PVDs and the alignment transformation is then estimated for them based on the obtained corresponding pores if any. After the two fingerprints are aligned, the minutiae and pores on them are matched, giving the similarity between them. If this similarity is above a predetermined threshold, the two fingerprints are said to be matched, or from the same finger. Based on the foregoing approach, a new fully automated partial fingerprint recognition system is developed. This system includes a proprietary hardware that automatically acquires fingerprint fragments with 1200 dpi resolution and does the user authentication from these images by using the foregoing methods.

Features used in this invention include ridge orientations and frequencies, ridge images, valleys, minutiae and pores. The fingerprint images used in the following description are 1200 dpi. But it should be appreciated that the present invention is not restricted to 1200 dpi. Fingerprint images of resolutions lower or higher than 1200 dpi can be also used with this invention given that the foregoing mentioned features can be reliably extracted from them.

Figure 1A:
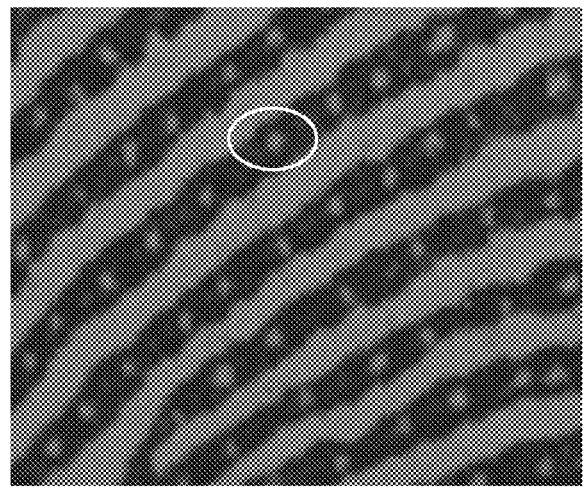
FIGS. 1(a) and 1(b) illustrate partial fingerprints of two different fingers.
Figure 1B:
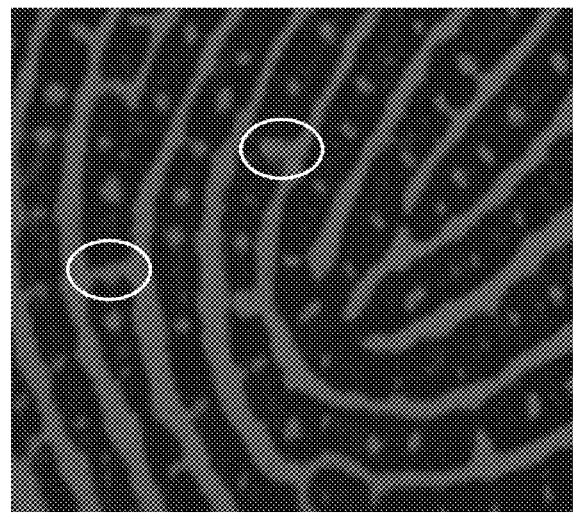

FIGS. 1a and 1b illustrate partial fingerprints of two different fingers. The ellipse in FIG. 1a illustrates a closed pore; the ellipses in FIG. 1b illustrate two open pores.

Figure 4A:
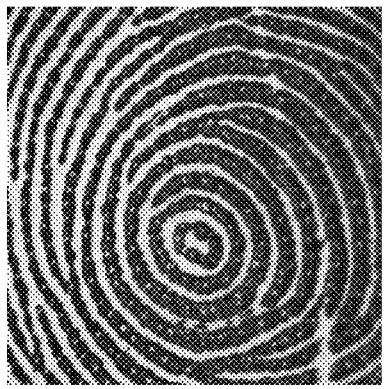
FIG. 4(a) illustrates an original fingerprint image.
Figure 4D:
FIG. 4(d) is the fingerprint image at large scale.
Figure 4B:
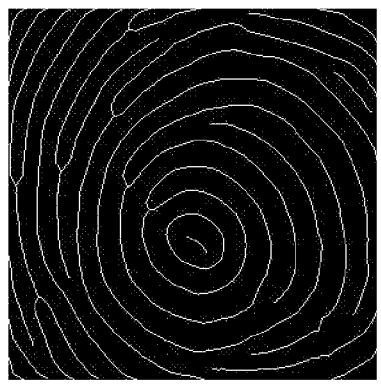
FIG. 4(b) illustrates an extracted skeleton valley image; Gaussian filtering outputs.
Figure 4E:
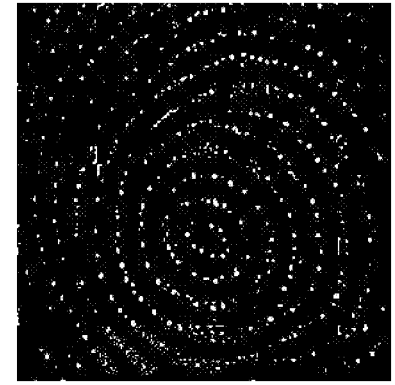
FIG. 4(e) is the difference of the image between 4(c) and 4(d)
Figure 4C:
FIG. 4(c) is the fingerprint image at a small scale.
Figure 4F:
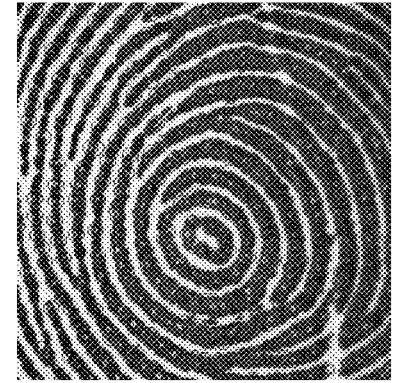
FIG. 4(f) illustrates extracted pores after post-processing.

To extract features from a 1200 dpi fingerprint image, it is firstly smoothed and down-sampled to 600 dpi. The ridge orientation fields and frequencies on the fingerprint image are then calculated. Based on local ridge orientations and frequencies, a bank of Gabor filters are used to enhance the ridges on the fingerprint. By binarizing the enhanced fingerprint image, the binary ridge image is obtained on which pixels on ridges are white and otherwise black. On fingerprints, valleys and ridges are complementary to each other. Therefore, the binary valley image can be obtained as the complement of the obtained binary ridge image. To exclude the affection of background in complement calculation, the fingerprint region mask is employed here to filter out the background if any. The binary valley image is then thinned to make all valleys become single-pixel lines. On this skeleton valley image, there could be some false and broken valleys due to scars and noise. Thus it is further post-processed by connecting valley endings if they are very close and have opposite directions, removing valley segments between valley endings and/or valley bifurcations if they are very short or their orientations differ much from the local ridge orientations. Minutiae are also extracted from the thinned skeleton ridge map. Finally, the obtained ridge orientation and frequency images, binary ridge image, skeleton valley image, and minutia features are all up-sampled to the original 1200 dpi. FIG. 4(b) shows the skeleton valley image extracted from the original fingerprint fragment in FIG. 4(a).

With respect to the pore features, this invention presents two methods to extract the pores from fingerprint images. The first one is based on Gaussian filters. Referring to FIG. 1, on the fingerprint images captured using an optical contact fingerprint sensor, ridges (valleys) appear as dark (bright) lines, whereas pores are bright blobs on ridges, either isolated (i.e. closed pores) or connected with valleys (i.e. open pores). Since pores are circle-like structures, their spatial distributions are similar to 2D Gaussian functions. The cross sections of valleys are also Gaussian-like shapes. But they are of different scales. To be specifically, valleys usually have larger scales than pores. Based on this observation, two Gaussian filters are used, one having a small scale and the other a large scale, to convolve with the image. The difference between their outputs then gives an initial result of pore extraction. This is very like the DoG (Difference of Gaussian) approach which is a classical method for blob detection. The difficulty here is how to estimate the scales of the Gaussian filters. Considering the deformation is often not uniform across a fingerprint image and different fingerprints could have different ridge frequencies, the fingerprint is partitioned into a number of blocks and the scales of Gaussian filters are estimated adaptively for each block. Take a block image $I_B$ as an example. Suppose the mean ridge period over this block is p. It is a good measure of the scale in its corresponding fingerprint block. Thus, the standard deviations of the two Gaussian filters are set to $k_1 p$ and $k_2 p$, respectively ($0 < k_1 < k_2$ are two constants). The outputs of them are $$F_1 = G(k_1 p) * I_B, \quad F_2 = G(k_2 p) * I_B, \tag{3}$$

$$G(i, j; \sigma) = \frac{1}{\sqrt{2\pi}\,\sigma} e^{-\frac{i^2+j^2}{2\sigma^2}} - m_G, \tag{4}$$

where '*' denotes convolution, and $m_G$ is used to normalize the Gaussian filter to be zero-mean. These filtering outputs are further normalized to [0, 1] and two thresholds $T_1$ and $T_2$ are used to binarize them, resulting in $B_1 = F_1 > T_1$ and $B_2 = F_2 > T_2$. Subtracting $B_2$ from $B_1$ gives the initial result of pore extraction: $P_B = B_1 - B_2$. This is because the small scale Gaussian filter enhances both pores and valleys whereas the large one enhances valleys only. To remove possible spurious pores from the initial pore extraction result $P_B$, the following constraints are applied to post-processing the result. (a) Pores should reside on ridges only. To implement this constraint, the binary ridge image is employed as a mask to filter the extracted pores. (b) Pores should be within a range of valid sizes (e.g., between 3 and 30). The size of a pore is measured by the number of pixels inside its region. (c) The mean intensity of a true pore region should be large enough and its variance should be small. Finally, the extracted pore image is obtained. FIGS. 4(c)-(f) show examples of pore extraction results for the fingerprint in FIG. 4(a).

With more observation of the pore appearance as shown in FIGS. 3(a-c), it can be found that only closed pores are 2D-Gaussian shaped. Thus, the above method still can be improved by using more precise pore models. Referring to the pore appearance in FIGS. 3(a-c), along the ridge direction, all the three types of pores appear with nearly Gaussian profile. Based on this, the following pore model is proposed $$APM_0(i, j) = e^{-\frac{j^2}{2\sigma}} \cdot \cos\left(\frac{\pi}{3\sigma} i\right) \tag{5}$$

$$APM_\theta(i, j) = Rot(APM_0, \theta) \tag{6}$$

where Rot (M, θ) means rotating M by θ degrees. The size of the pore model is set to 6σ+1, where σ is used to control the pore scale and it is determined by the local ridge period. θ is used to control the direction of the pore model and it can be estimated by the local ridge orientation. Since both the two parameters are adaptively determined based on local fingerprint ridge period and orientation, this model is called the adaptive pore model (APM). FIG. 3d shows an example APM with θ=0. To extract pores from a fingerprint image, it is partitioned into blocks as in the foregoing Gaussian filter based method. For each block, the ridge orientation inconsistency (OIC) is calculated as follows:

$$OIC(b) = std(\cos(2 \cdot O(b))) \tag{7}$$

where O(b) is the orientation field in the $b^{th}$ block and std denotes the standard deviation. If the OIC of a block is less than a threshold (e.g. 0.5) or the block size is very small (e.g. 20 pixels in width and height), the partition stops; otherwise, the block is further averagely partitioned into four sub-blocks. The mean orientation $\bar{\theta}$ and the median ridge period $\hat{\tau}$ in the block are calculated and the local pore model for the block is then set as $APM_{\bar{\theta}}$ with $\sigma = \hat{\tau}/k$ (e.g. k=12). The local APM is then taken as a matched filter and convolved with the fingerprint image block. A threshold is then used to segment out the initial pores on the block, which are further post-processed to give the final pore extraction results by using the constraints shown before to remove spurious pores.

Figure 5A:
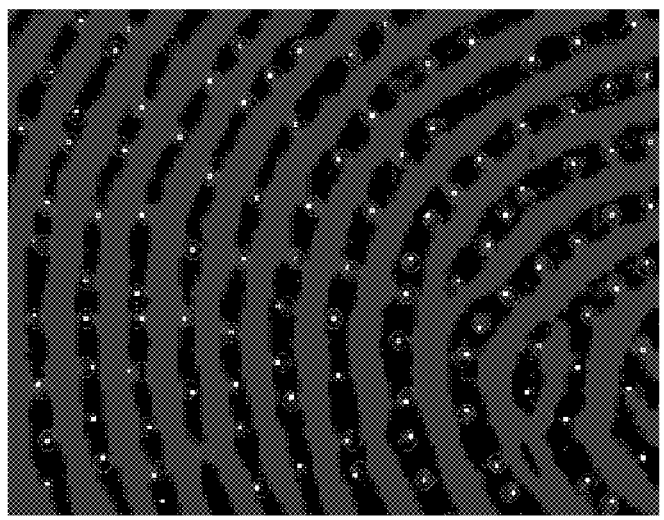
FIG. 5 illustrates the pore extraction results of (a) APM based method, (b) Jain's method and (c) Ray's method.
Figure 5B:
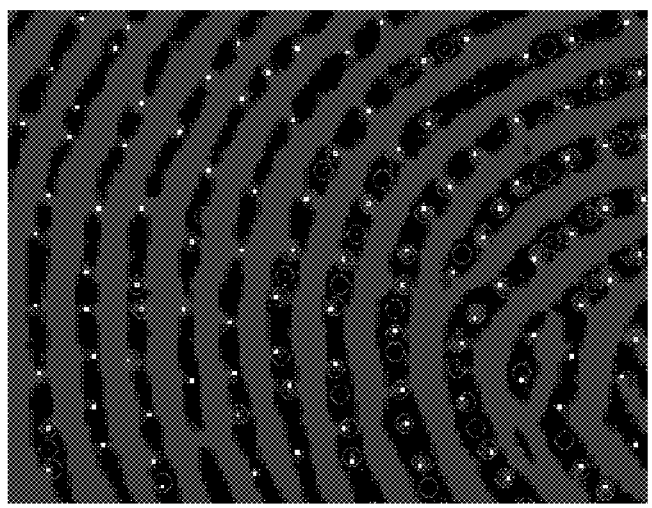
Figure 5C:
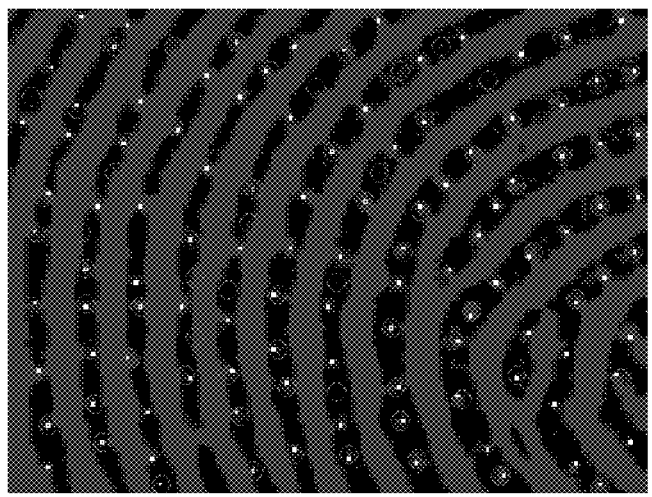

Currently there is no public database of high resolution fingerprint images available. Therefore to evaluate the present APM based pore extraction method, we built a 1200 dpi fingerprint scanner and collected 198 fingerprint images (320×240). These fingerprints were taken from 33 index fingers, each of which has six samples taken in two sessions (about 5 days apart). The pores in ten fingerprint images were manually marked. FIGS. 5A to 5C show cropped fingerprint images, on which the pores are manually marked with brighter dots. The pore extraction results by the proposed APM based method, Ray's and Jain's methods are also shown in FIG. 5, where the extracted pores are marked with circles. From FIG. 5, it can be seen that when the ridge widths change much, both Jain's and Ray's methods will miss some pores because they are not adaptive to the scale and orientation of pores and ridges. Instead, the proposed APM based method can well adapt itself to local ridge width and orientation and it successfully detects most of the pores. The true detection rate RT (i.e. the ratio of the number of detected true pores to the number of all true pores) and the false detection rate RF (i.e. the ratio of the number of falsely detected pores to the number of all detected pores) were calculated on the ten fingerprint images for all the three methods. The average rates are listed in Table 1 below:

TABLE 1

|  | APM | Jain's | Ray's |
| --- | --- | --- | --- |
| $R_T$ | 82.8% | 74.1% | 63.4% |
| $R_F$ | 13.9% | 22.2% | 20.4% |

Figure 6:
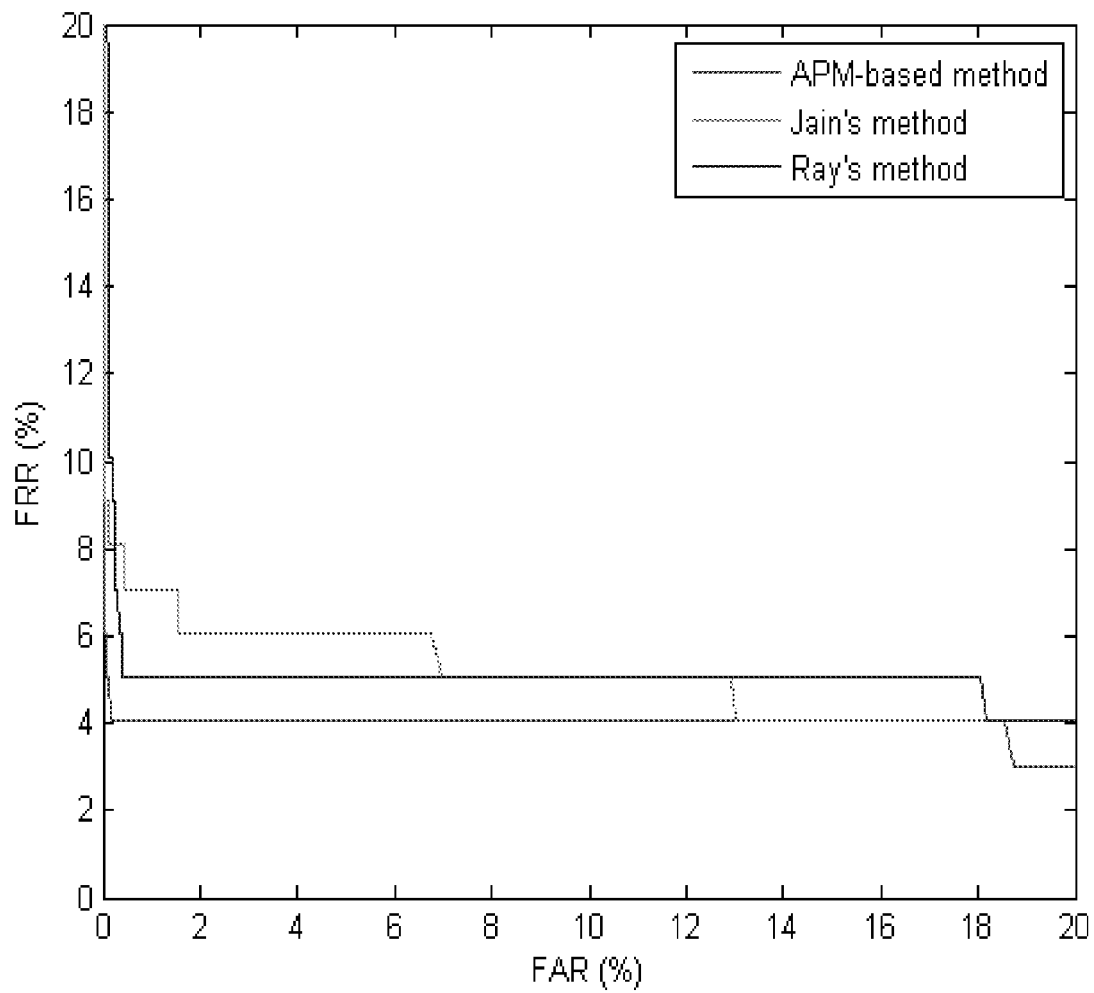
FIG. 6 illustrates the ROC curves by the three pore based fingerprint recognition systems.

Table 1 is the true detection and false detection rates of the three methods. The results show that the proposed APM based pore extraction method can extract pores more accurately and more robustly. Furthermore, the contribution of the three pore extraction methods to the verification accuracy of AFRS has also been assessed. Three simple AFRS were implemented. They use the same minutia extraction and matching methods, but are coupled with one of the three pore extraction methods respectively. The Iterative Closest Point (ICP) algorithm is used to match the pores lying in the neighborhoods of two matched minutiae with higher similarity. The distance between two fingerprints is defined as the summation of three terms: the minutiae based dissimilarity between them, the mean distance between matched pores (normalized to [0, 1]), and the ratio of the number of unmatched pores to the total number of pores. Therefore, the differences between the verification accuracies of the three AFRS depend only on the pore extractors they use. The ROC curves by the three AFRS on our collected fingerprint image database are plotted in FIG. 6. These curves demonstrate again that the APM based method over-performs the other two methods in contribution to verification accuracy. The EER of the APM based method is 4.04% whereas Jain's method 6.03% and Ray's method 5.05%.

In order to use pores to align fingerprints, a descriptor is needed to describe the pore features so that the correspondences between pores can be accurately determined. This descriptor should be invariant to rotation and translation because such deformations are very common in capturing fingerprints. In most of previous studies on pore based fingerprint recognition, a pore is simply described by its location. However, much other information is also very useful in distinguishing pores, such as the ridge and valley structures surrounding the pore and the ridge orientation field in the neighborhood to the pore. As pores reside on ridges, different pores could be distinguished from each other by the ridges on which they reside and those surrounding them. Considering that ridges and valleys are complementary on fingerprints, this invention makes use of the neighboring valley structures and ridge orientation field to describe pores and the resulting descriptor is called the Pore-Valley Descriptor (PVD). The definition of PVD is given below.

Figure 7:
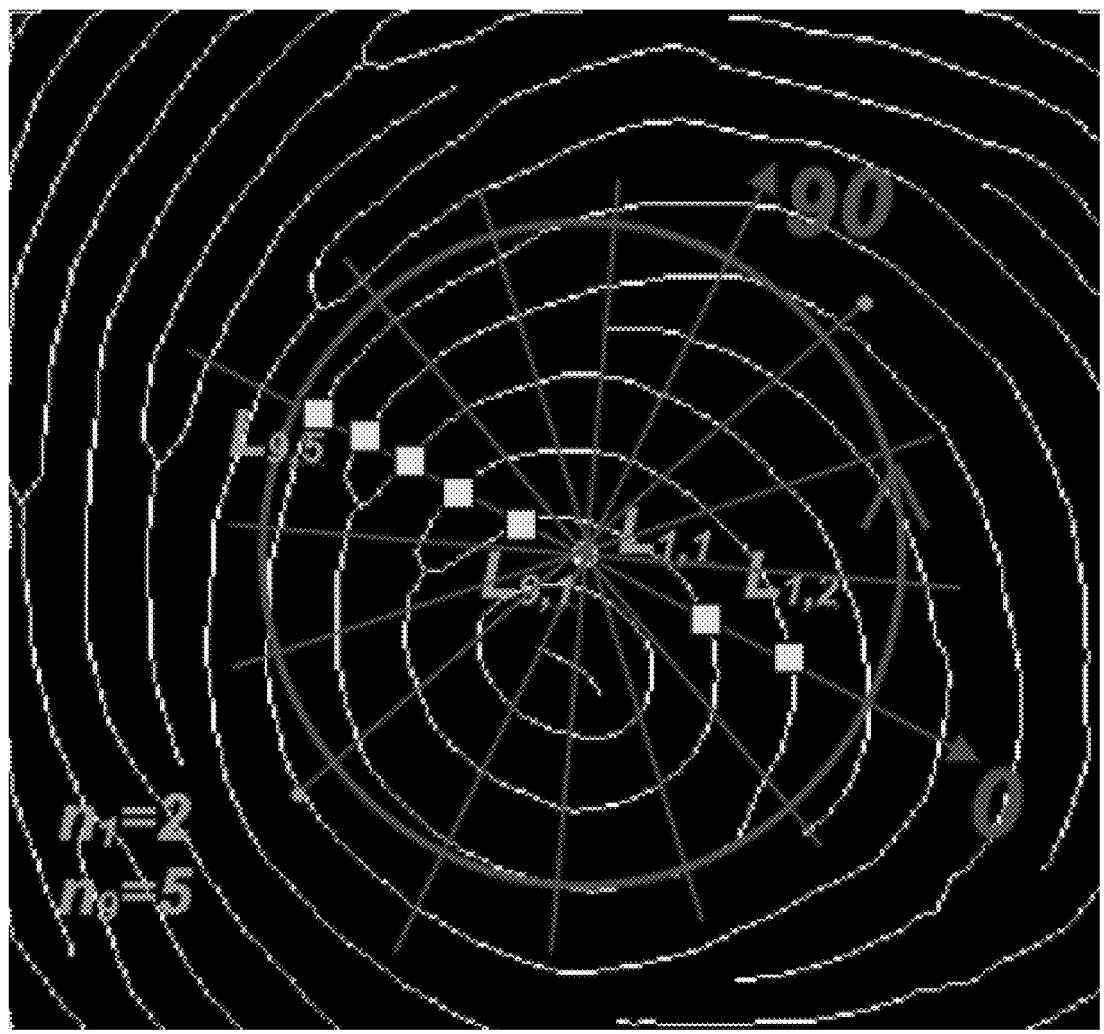
FIG. 7 is an illustration of Pore-Valley Descriptor with $k_n=4$ and $\theta_s=22.5°$.

Two basic attributes of a pore are its location (X,Y) and orientation θ. The location of a pore is defined as the column and row coordinates of the center of its mass, and its orientation is defined as the orientation of its resided ridge at (X,Y). In order to sample the valley structures in the pore's neighborhood, a local polar coordinate system is established for the pore as shown in FIG. 7 by setting its origin as the pore's location, its polar axis as the pore's orientation (pointing to the right/bottom side), and its polar angle as the counterclockwise angle from the pore axis. A circular neighborhood is then chosen for the pore with its center at the pore's location and radius as $R_n = k_n p_{max}$ ($p_{max}$ is the maximum ridge period on the fingerprint and $k_n$ is a parameter to control the neighborhood size). Some radial lines are drawn starting from $\phi_1 = 0°$ with a degree step $\theta_s$ until $\phi_m = m \cdot \theta_s$ ($m = \lfloor 360°/\theta_s \rfloor$ is the total number of radial lines). The intersections of each line with valleys in the neighborhood are calculated. These intersections together with the pore give rise to a number of line segments, which are numbered from inside to outside and whose lengths are calculated as features. As in FIG. 7, 22.5 degree is taken as the step and hence 16 lines are employed. Taking the 0 degree and 180 degree lines as examples, there are two and five segments along them respectively. The ridge orientation field in the pore's neighborhood is another important feature. It can be used to roughly distinguish pores. The ridge orientation inconsistency (OIC) in the neighborhood $N_p$ $$OIC(N_p) = std(cos(2 \cdot OF(N_p))), \quad (8)$$

is used to capture this information, where $OF(N_p)$ is the ridge orientation field in the neighborhood $N_p$ and std denotes the standard deviation. With all these features, we define the Pore-Valley Descriptor (PVD) as the following feature vector Θ:

$$\Theta = [X, Y, \theta, OIC(N_p), \vec{S}_1, \vec{S}_2, \ldots, \vec{S}_m] \quad (9)$$

$$\vec{S}_k = [n_k, L_{k,1}, L_{k,2}, \ldots, L_{k,n_k}], k = 1, 2, \ldots, m. \quad (10)$$

Here, $n_k$ is the number of line segments along the $k^{th}$ line, and $L_{k,n}$ denotes the length of the $n^{th}$ segment ($1 \leq n^{th} \leq n_k$) along the $k^{th}$ line. The OIC component and the sampled valley structure features in the above defined PVD are invariant to rotation and translation thanks to that it is defined with respect to the local coordinate system of the pore. The OIC component is a coarse feature. It will be used at the first step of roughly matching pores. The sampled valley structure features are fine features. They will be used at the second fine matching step. The pore locations and orientations will be used in the double checking of pore correspondences. Finally, the transformation between fingerprints will be estimated based on the locations and orientations of corresponding pores on them.

To align two fragmentary fingerprint images based on the pores, the first step is to find out pore correspondences on fingerprints. However, due to the large quantity of pores (even on a fingerprint fragment of 6.24×4.68 mm² as those connected in our experiments there could be hundreds of pores), it is very time consuming to match pores in pairs directly using their surrounding valley structures (i.e. the segment lengths recorded in the PVD). Therefore, a coarse matching is necessary. The OIC components in the PVD can serve this purpose. To be specifically, given two pores, their OIC features are first compared. If the absolute difference between their OIC features is larger than a given threshold $T_{oic}$, they cannot be matched; otherwise, proceed to the next fine matching step.

After the coarse matching, a large number of false matches between pores have been excluded. In the subsequent fine matching, the valley structures in the two pores' neighborhoods are compared. According to the definition of PVD, each pore is associated with several groups of line segments, which capture the information of its surrounding valleys. These segments are compared group by group. When comparing the segments in the $k^{th}$ group, where there are $n_k^1$ and $n_k^2$ segments in the two pores' descriptors, the common segments in the group are found, i.e. the first $\hat{n}_k = \min\{n_k^1, n_k^2\}$ segments. If any group has zero common segments ($\hat{n}_k = 0$), the two pores are said to be unmatched. Otherwise, the differences between all corresponding common segments are calculated. The mean absolute difference between all common segments in all groups is taken as the dissimilarity between the two pores. The smaller this dissimilarity is, the more similar the two pores are. After comparing all possible pairs of pores which pass the coarse matching, each pair of pores is assigned with a dissimilarity defined as above. They are then sorted according to their dissimilarities from the smallest to the largest, resulting in the initial correspondences between the pores.

Figure 8:
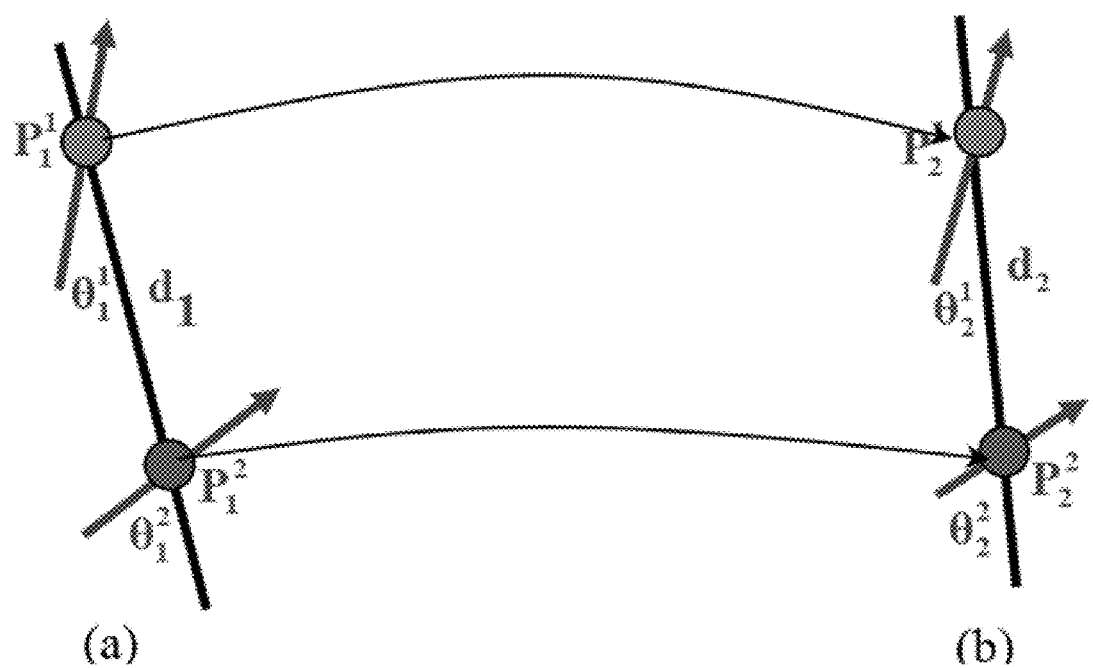
FIG. 8 is an illustration of the relevant measures used in pore correspondence double checking.

The top K initial pore correspondences (i.e. with the smallest dissimilarities) are further double checked to get the final pairs of corresponding pores for transformation estimation. The double checking is to calculate the supports for all pore correspondences based on the global geometrical relationship between the pores. At the beginning of double checking, the supports to all pore correspondences are initialized to zero. FIG. 8 illustrates the relevant measures used. Assume $\{P_1^1, P_2^1\}$ and $\{P_1^2, P_2^2\}$ are two pairs of corresponding pores among the top ones on two fingerprints. To check them, the following metrics are calculated (I) the distances, denoted by $d_1$ and $d_2$, between the pores on the two fingerprints, (II) and the angles, denoted by $\{\theta_1^1, \theta_2^1\}$ and $\{\theta_1^2, \theta_2^2\}$, between their orientations and the lines connecting them. If both the distance difference and the angle differences are below given thresholds $T_d$ and $T_\alpha$, i.e.

$$|d_1 - d_2| \leq T_d, |\theta_1^1 - \theta_2^1| \leq T_\alpha, \text{ and } |\theta_1^2 - \theta_2^2| \leq T_\alpha, \quad (11)$$

the supports to these two correspondences are increased by 1; otherwise, the support to the correspondence with larger dissimilarity is decreased by 1, whereas the support to the other one keeps the same. After checking all the top K correspondences two by two, those obtaining a non-negative support are taken as the final pore correspondences. If no correspondences can obtain non-negative supports, the two fingerprints cannot be aligned; in other words, they have no overlap.

If some corresponding pores are found, the transformation can be then estimated based on them. Here, take the following rotation and translation as example $$\begin{bmatrix} \tilde{X}_2 \\ \tilde{Y}_2 \end{bmatrix} = \begin{bmatrix} \cos\beta & -\sin\beta \\ \sin\beta & \cos\beta \end{bmatrix} \begin{bmatrix} X_2 \\ Y_2 \end{bmatrix} + \begin{bmatrix} \Delta X \\ \Delta Y \end{bmatrix} = R \begin{bmatrix} X_2 \\ Y_2 \end{bmatrix} + t, \quad (12)$$

where $(X_2, Y_2)$ are the coordinates of a pore on the second fingerprint and $(\tilde{X}_2, \tilde{Y}_2)$ its transformed coordinates in the first fingerprint's coordinate system, R and t are the rotation and translation matrixes. The task is to estimate the transformation parameters $(\beta, \Delta X, \Delta Y)$, where $\beta$ is the rotation angle and $\Delta X$ and $\Delta Y$ are the column and row translations respectively. If there is only one pair of corresponding pores found on the two fingerprints, the transformation parameters are directly estimated from the locations and orientations of the two pores, $(X_1, Y_1, \theta_1)$ and $(X_2, Y_2, \theta_2)$. Let $\beta_1 = \theta_1 - \theta_2$ and $\beta = \text{sgn}(\beta_1) \cdot (\text{abs}(\beta_1) - \pi)$, where $\text{sgn}(\cdot)$ is the sign function and abs denotes the absolute value, then $$\beta = \begin{cases} \beta_1 & \text{if } \text{abs}(\beta_1) \leq \text{abs}(\beta_2) \\ \beta_2 & \text{else,} \end{cases} \quad (13)$$

$$\Delta X = X_1 - X_2 \cos\beta + Y_2 \sin\beta, \quad (14)$$

$$\Delta Y = Y_1 - Y_2 \sin\beta - Y_2 \cos\beta. \quad (15)$$

If there are more corresponding pores, the rotation and translation parameters are estimated by minimizing the least square errors between corresponding pores' locations, i.e.

$$\frac{1}{C} \sum_{i=1}^{C} \left\| \begin{bmatrix} X_1^i \\ Y_1^i \end{bmatrix} - R \begin{bmatrix} X_2^i \\ Y_2^i \end{bmatrix} - t \right\|^2 \quad (16)$$

where $\{(X_1^i, Y_1^i) | i = 1, 2, \ldots, C\}$ and $\{(X_2^i, Y_2^i) | i = 1, 2, \ldots, C\}$ are C pairs of corresponding pores, '$\|\|$' is the L2-Norm. It can be shown that $$t = \begin{bmatrix} \overline{X}_1 \\ \overline{Y}_1 \end{bmatrix} - R \begin{bmatrix} \overline{X}_2 \\ \overline{Y}_2 \end{bmatrix} \quad (17)$$

where $\overline{X}_j = (\sum_{i=1}^{C} X_j^i)/C$, $\overline{Y}_j = (\sum_{i=1}^{C} Y_j^i)/C$, $j = 1, 2$. Let $$B = \frac{1}{C} \begin{bmatrix} \sum_{i=1}^{C} (X_1^i - \overline{X}_1)(X_2^i - \overline{X}_2) & \sum_{i=1}^{C} (Y_1^i - \overline{Y}_1)(X_2^i - \overline{X}_2) \\ \sum_{i=1}^{C} (X_1^i - \overline{X}_1)(Y_2^i - \overline{Y}_2) & \sum_{i=1}^{C} (Y_1^i - \overline{Y}_1)(Y_2^i - \overline{Y}_2) \end{bmatrix} \quad (18)$$

and its singular value decomposition be B=UDV, then R=VU', where U' is the transpose of U, and $\beta = \arcsin(R_{21})$, where $R_{21}$ is the entry at the second row and first column of R.

Figure 9:
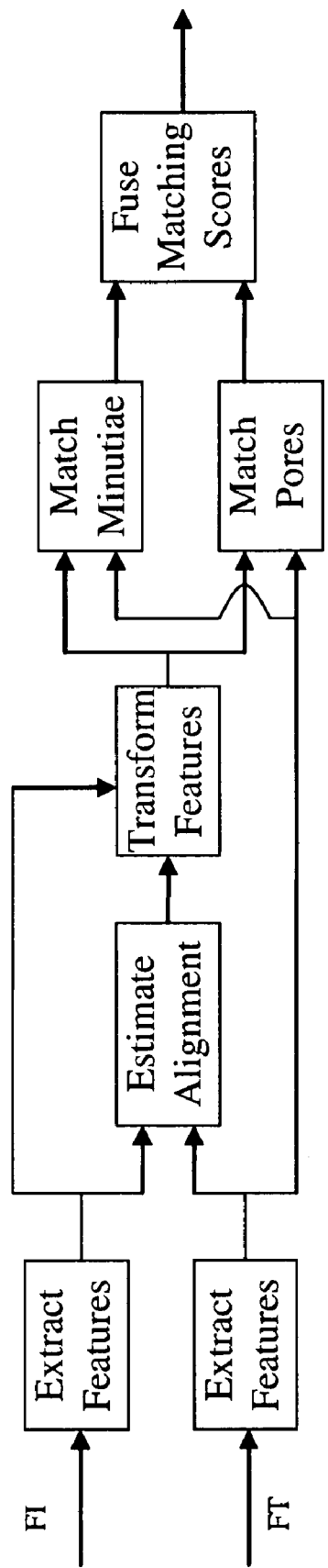
FIG. 9 illustrates the matching procedure in the evaluation system in which FI and FT denote the input and template fingerprints, respectively.

Based on the foregoing feature extraction and alignment methods, this invention presents a fragmentary fingerprint recognition system. This system captures fingerprint images using a 1200 dpi optical fingerprint scanner. It extracts features from an input fingerprint image and a template fingerprint image, and estimates the alignment transformation between them. The minutiae and pores on the input fingerprint image are transformed into the coordinate system of the template fingerprint according to the estimated transformation. Minutiae and pores on the two fingerprint images are then matched separately. Two minutiae are thought to be matched if the difference between their locations and the difference between their directions are both below given thresholds. As for two pores, if the difference between their locations is below a given threshold, they are matched. The minutia matching score is defined as the ratio between the number of matched minutiae to the total number of minutiae, and the pore matching score is defined similarly. The final matching score is obtained by fusing the minutia and pore matching scores using the summation rule. FIG. 9 shows the procedure of matching an input fingerprint with a template fingerprint in the evaluation system.

Figure 10A:
FIGS. 10(a)-(h) illustrate examples corresponding feature point detection results using minutiae based and PVD based methods.
Figure 10B:
Figure 10C:
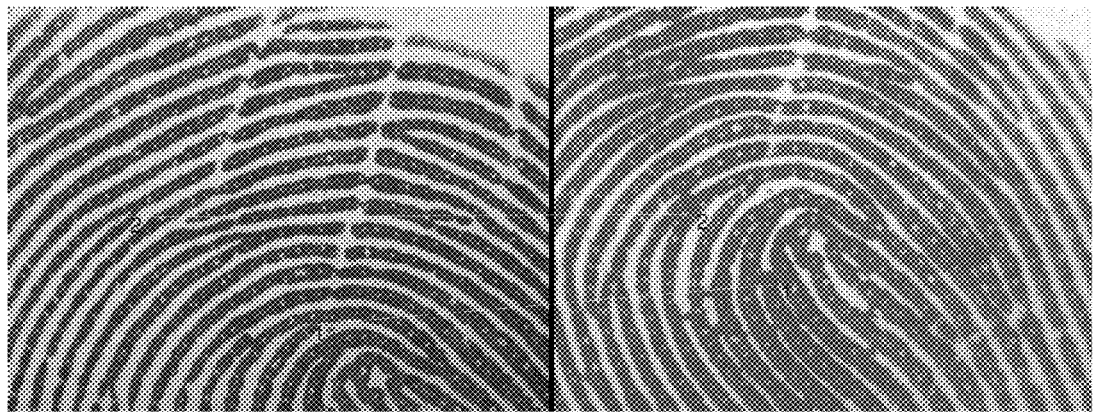
Figure 10D:
Figure 10E:
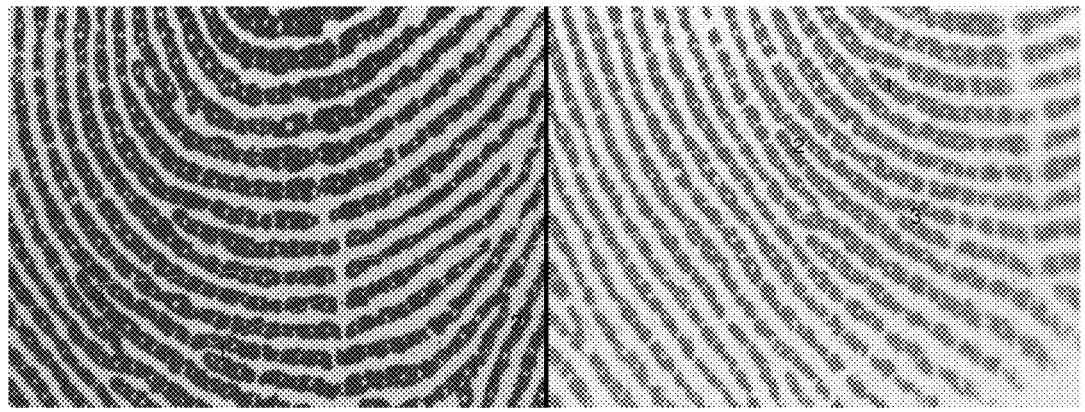
Figure 10F:
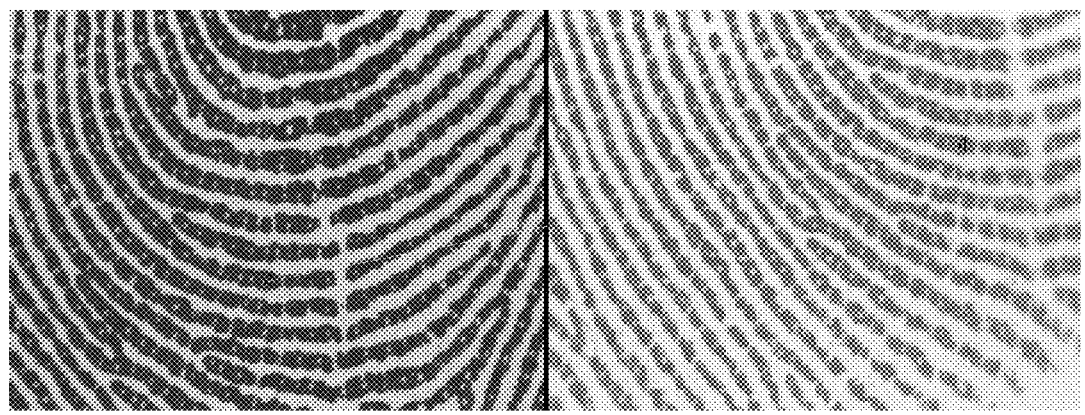
Figure 10G:
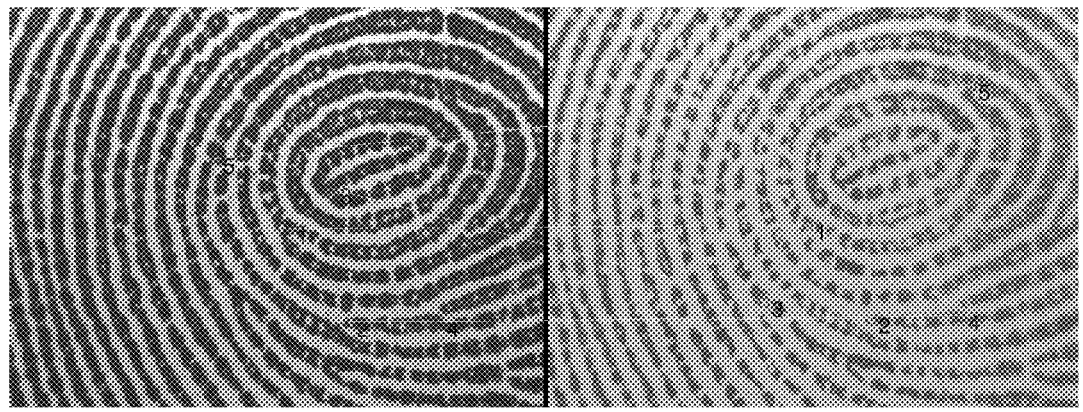
Figure 10H:
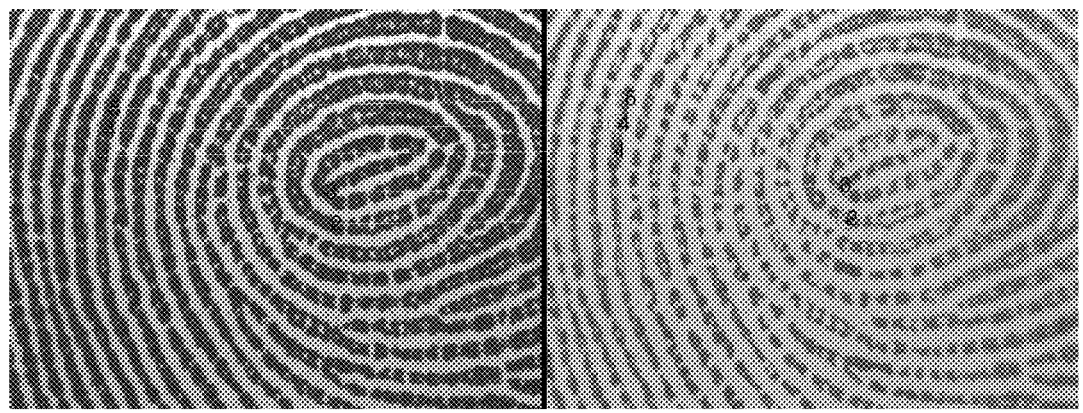
Figure 11A:
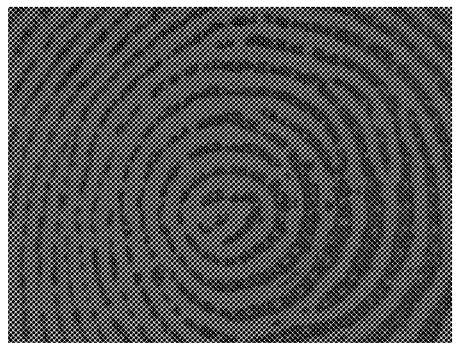
FIG. 11 illustrates six simulated fingerprint fragments: Reference sample (a) 01-01 and test samples (b) 01-02, (c) 01-03, (d) 01-04, (e) 01-05, and (f) 01-06.
Figure 11D:
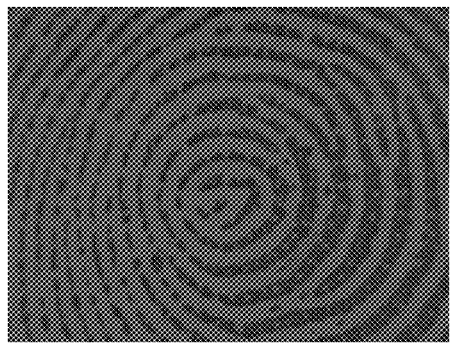
Figure 11B:
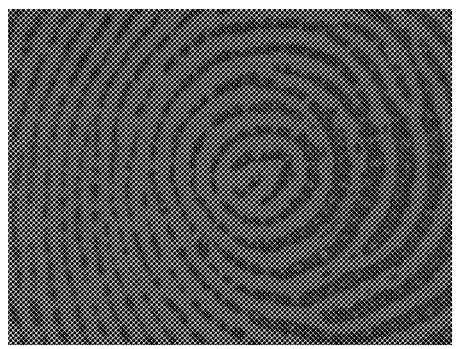
Figure 11E:
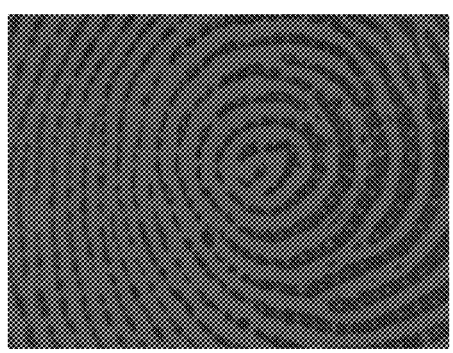
Figure 11C:
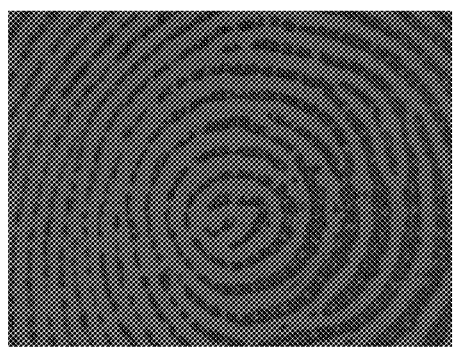
Figure 11F:
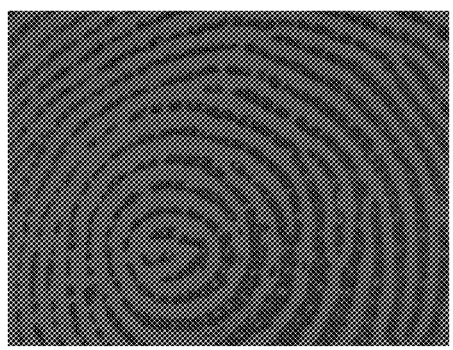
Figure 12A:
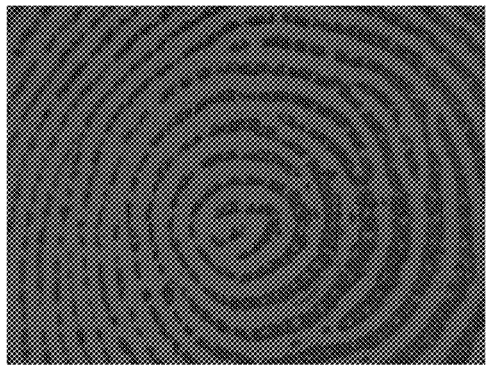
FIG. 12 illustrates examples of alignment results of (c) PVD based method and (d) OF based method on the pair of fingerprint fragments shown in (a) and (b).
Figure 12B:
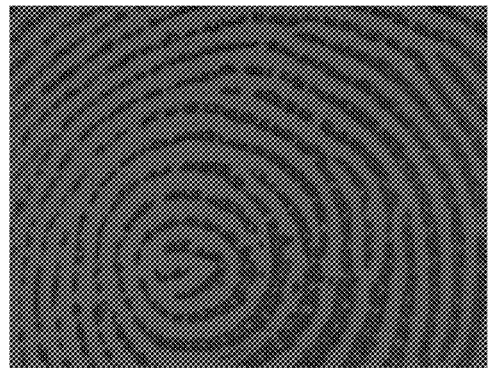
Figure 12C:
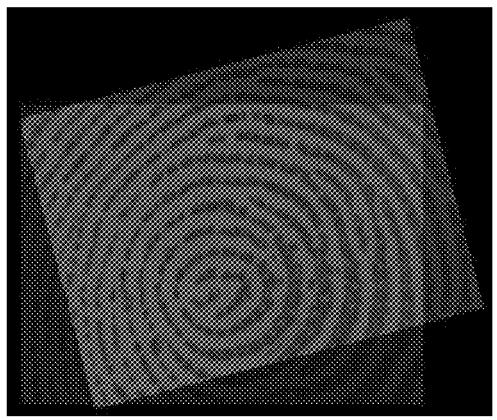
Figure 12D:
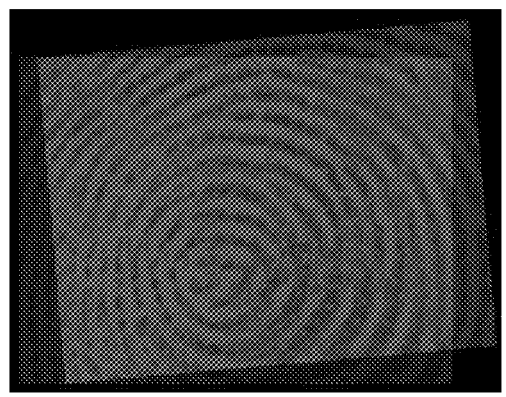

The present invention uses the valley structures in the neighborhood of pores to align fingerprint fragments. The valley structures are sampled along a number of different directions, determined by the degree step $\theta_s$ (referred as sampling rate). Therefore, the neighborhood size and sampling rate are significant to the alignment performance. Intuitively, small neighborhood sizes or sparse sampling rates will make the resulting PVDs less discriminative but require less computational resources, whereas large neighborhood sizes or dense sampling rates will lead to more noise-sensitive and costly PVDs. This effect has been evaluated using 50 pairs of fingerprints. Each pair is from a same finger and various deformations can be observed between them. The fingerprints in these pairs also display different quality. The neighborhood size was firstly set to 4 times of the maximum ridge period, i.e. $k_n=4$, and the accuracy of corresponding pore detection was investigated under different sampling rates $\theta_s \in \{15°, 22.5°, 30°, 45°\}$. Two measures were used to evaluate the accuracy: the percentage of correct top one pore correspondence (M1) and the average percentage of correct correspondences among the top five pore correspondences (M2). Table 2 gives the results on the 50 pairs of fingerprints.

tiae based method "*A New Algorithm for Distorted Fingerprints Matching based on Normalized Fuzzy Similarity Measure*," (Chen et al.) in terms of the accuracy of corresponding feature point detection. In the experiments, 1800 fingerprint fragments (320 by 240 pixels) were collected from 180 fingers (thumb and index fingers of left and right hands) of 45 persons in two sessions (about one week apart, five images were captured from each finger in each session) using the 1200 dpi fingerprint scanner. 200 pairs of fragmentary fingerprints were randomly generated from these images for evaluation. In each pair, the two fingerprints were from a same finger and captured at different sessions. FIG. 10 shows some example pairs of fingerprint fragments. On the figures, the detected corresponding minutiae and pores are connected to each other using lines. When there are more than five pairs of corresponding minutiae or pores, we show only the first five pairs. In FIGS. 10(a) and 10(b), both methods find correctly top five feature point correspondences. However, when the finger conditions change from session to session, for example because of perspiration, the minutiae based methods will tend to detect false minutiae and minutia correspondences. FIG. 10(c) shows a pair of fingerprints of a finger, in which broken valleys occur on the second print due to perspiration. As a result, the detected two minutia correspondences are totally wrong. The fingerprint fragments in FIG. 10(e) have large deformation and they have small overlap. Consequently, very few (fewer than 10) minutiae can be found falling in their overlapping regions. In such case, the minutiae based method fails again because of lacking of sufficient minutiae. Even when two fragmentary fingerprints overlap much, there could be still very few minutiae available on them because they capture very small fingerprint areas. As can be seen in FIG. 10(g), some false minutia correspondences are detected on the two fingerprint fragments due to insufficient minutiae. For comparison, the results of the proposed method on these fingerprints are given on FIGS. 10(d), 10(f), and 10(h), which show that the proposed method works well with all of them.

The two measures, M1 and M2, were also calculated for the two methods on all the 200 pairs of fragmentary fingerprints. The results are listed below in Table 3.

TABLE 2

| | $k_n = 4$ | | | | $\theta_s = 22.5°$ | | | | |
|---|---|---|---|---|---|---|---|---|---|
| | $\theta_s = 15°$ | $\theta_s = 22.5°$ | $\theta_s = 30°$ | $\theta_s = 45°$ | $k_n = 3$ | $k_n = 3.5$ | $k_n = 4$ | $k_n = 4.5$ | $k_n = 5$ |
| M1 | 60% | 96% | 90% | 80% | 50% | 78% | 96% | 80% | 62% |
| M2 | 71.1% | 91.7% | 82.2% | 73.2% | 56.7% | 80.2% | 91.7% | 85.6% | 62.5% |

From the results, it can be seen that the sampling rates at $\theta_s=22.5°$ and $\theta_s=30°$ give the best accuracy. The sampling rate was then set to $\theta_s=22.5°$ and the effect of different neighborhood sizes $k_n \in \{3, 3.5, 4, 4.5, 5\}$ was further investigated. Again, it can be observed that too small and too large neighborhoods both cannot achieve the best accuracy. All these results prove the proposition on the neighborhood size and sampling rate. In the following evaluation experiments, the parameters were set as $k_n=4$ and $\theta_s=22.5°$.

Detecting feature point correspondences is an important step in the alignment method proposed in this invention as well as many state-of-the-art minutia-based methods. The best alignment transformation is estimated based on the detected corresponding feature points (pores or minutiae). Considering the significance of correctly detecting corresponding feature points, experiments have been carried out to compare the proposed method with a state-of-the-art minu-

TABLE 3

| | M1 | M2 |
|---|---|---|
| Minutiae based method | 40% | 35.1% |
| PVD based method | 97% | 91.86% |

Table 3 illustrates the corresponding feature point detection accuracy of the two methods. According to the results, the minutiae based method works very poorly whereas the proposed method can detect corresponding feature points on fragmentary fingerprints with a very high accuracy, achieving significant improvement to that of the minutiae based method. This demonstrates that the proposed alignment method can cope with various fingerprint fragments more accurately than minutiae based methods thanks to the large quantity and rich distinctiveness of pores on small fingerprint areas.

After obtaining the pore correspondences on two fingerprints, the alignment transformation between them can be then estimated based on the corresponding pores. In order to evaluate the performance of the proposed method on alignment transformation estimation, some ground truth fingerprint fragment pairs were made from four high resolution fingerprint images of four fingers which cover large fingerprint areas. The original size of these four fingerprint images is 800 by 600 pixels. From each of them, we first cropped a fragment of 320 by 240 pixels as reference and then generated five more test fragments: the first one is a clockwise 10 degree rotation of the reference (with regard to the left top corner of the image), the second one translates the reference towards the left by 5 pixels, the third one translates the reference towards the bottom by 10 pixels, the fourth one combines all the above three transformations, and the last one rotates the reference anti-clockwise by 15 degrees and then translates it towards the left and the bottom by 5 and 10 pixels respectively. FIG. 11 shows the six fragments of a fingerprint. Table 4 presents the estimation results of an OF based method and the proposed method on the simulated samples of the first fingerprint.

TABLE 4

| Reference sample | Test sample | Ground truth | | | OF based method | | | PVD based method | | |
|---|---|---|---|---|---|---|---|---|---|---|
| | | ΔY | ΔX | β | ΔY | ΔX | β | ΔY | ΔX | β |
| 01-01 | 01-02 | 0 | 0 | 10 | 7 | −10 | 5 | 0 | 0 | 9.96 |
| 01-01 | 01-03 | 0 | −5 | 0 | 1 | 0 | 0 | 0 | −5 | 0 |
| 01-01 | 01-04 | 10 | 0 | 0 | 0 | −3 | 0 | 9 | 0 | 0 |
| 01-01 | 01-05 | 10 | −5 | 10 | 8 | −13 | 5 | 8 | −7 | 10.09 |
| 01-01 | 01-06 | 10 | −5 | −15 | −1 | 12 | −5 | 10 | −3 | −14.67 |

In FIG. 12, example aligned fingerprint images are drawn by overlaying the reference image with the transformed test image. Obviously, the proposed method estimates the transformation parameters much more accurately and it does not have the initialization and quantization problems which greatly affect the performance of OF based method. Moreover, there is no guarantee that the OF based method always converges to the global optimal solution. Instead, it is very easily for it to be trapped in local minima when improper translation or rotation steps are used. Table 5 lists the average absolute errors (AAE) of the two methods over all the test samples.

TABLE 5

| | AAE(ΔY) | AAE(ΔX) | AAE(β) |
|---|---|---|---|
| OF based method | 6.2 | 8.6 | 5 |
| PVD based method | 0.9 | 0.9 | 0.23 |

These results clearly demonstrate that the proposed method can recover the transformation between fingerprints more accurately.

The system in this invention has been evaluated on the 1800 fingerprint fragments. In the experiment, each of the fingerprints collected in the second session (as input fingerprints) was compared with all the fingerprints collected in the first session (as template fingerprints).

Figure 13:
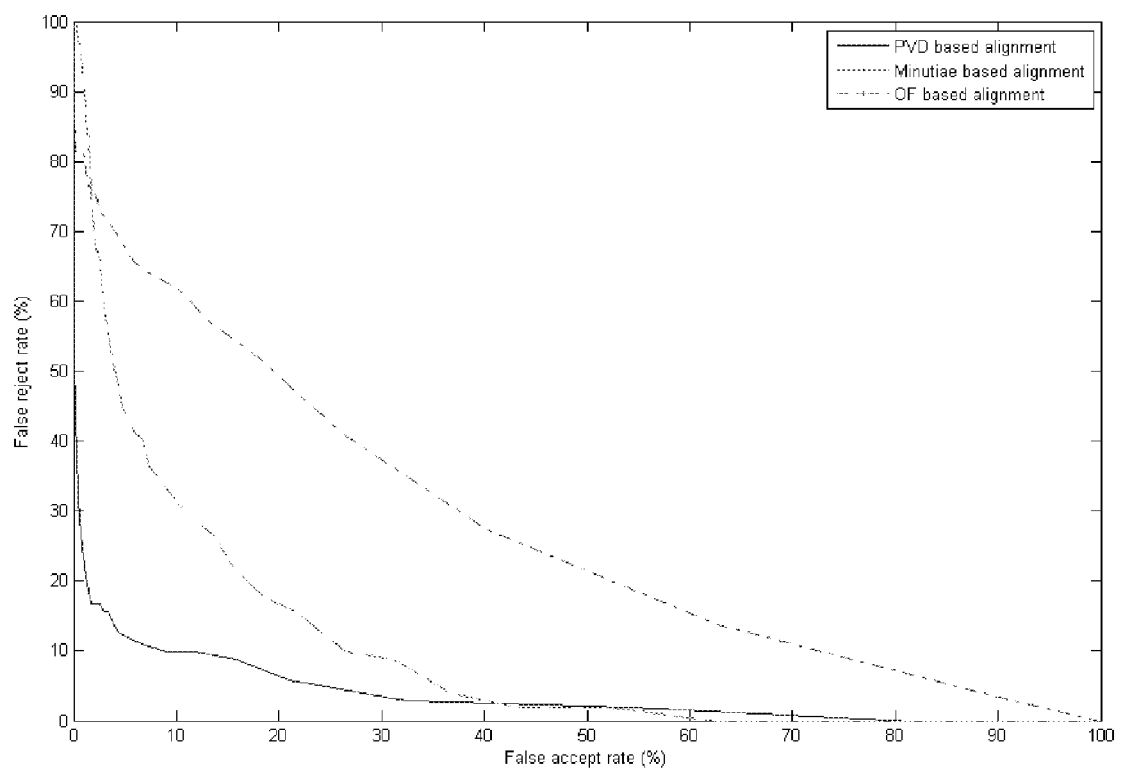
FIG. 13 illustrates the ROC curves of the fragmentary fingerprint recognition system when using the three alignment methods.

In addition to the alignment method proposed in this patent, the minutiae based alignment method as discussed in "A New Algorithm for Distorted Fingerprints Matching based on Normalized Fuzzy Similarity Measure" (Chen, et al.), and the OF based alignment method, as discussed in "Fingerprint Alignment Using a Two Stage Optimization" (Yager, et al.), have also been implemented in the system. FIG. 13 shows the receiver operating characteristic (ROC) curves of the system when using the three alignment methods. Based on the obtained results, we can see that the performance is much better when using the proposed PVD-based alignment method. The equal error rate (EER) of the proposed PVD-based alignment method is more than 40% lower than those of the minutiae based and OF based alignment methods (see Table 6).

TABLE 6

| | Minutiae based method | OF based method | PVD based method |
|---|---|---|---|
| EER (%) | 18.06 | 33.73 | 9.8 |

We observed that inaccurate alignments caused lots of matching errors. This validates that the proposed alignment method is more suitable for fragmentary fingerprints and can significantly improve the accuracy of fragmentary fingerprint recognition.

How to recognize small fingerprint fragments is for a long time a very challenging problem in the field of fingerprint recognition. Due to the continuing need of law enforcement and the increasing interests on small fingerprint sensors, it is becoming more and more stressing to devise methods suitable for fragmentary fingerprint recognition. This invention presents methods and systems for fragmentary fingerprint recognition, including feature extraction, alignment, and matching methods. To extract pores from fingerprint images, two methods, i.e. Gaussian filter based method and adaptive pore model based method, have been proposed. Many methods have been proposed to align fingerprints covering large areas, including correlation based, minutiae based, orientation field and other non-minutia feature based methods. However, these methods are either limited in alignment accuracy due to the quantization of transformation parameters or unsuitable for fragmentary fingerprint alignment because of lacking of sufficient features available for them on the small fingerprint fragments. This invention proposes a novel approach to fragmentary fingerprint alignment by using pores, kind of fine ridge features abundant on even small fingerprint fragments. To detect corresponding pores on two fingerprints to be aligned, we define a novel descriptor, namely Pore-Valley Descriptor (PVD), to describe pores based on their locations, orientations, and the ridge orientation fields and valley structures in their neighborhoods. Using the PVD, pores on the two fingerprints are matched based on the ridge orientation field and valley structures in their neighborhoods and their correspondences are further refined according to the global geometric relationship between them. Based on the obtained corresponding pores, the alignment transformation between the fingerprints is finally estimated. Based on the proposed methods, a fragmentary fingerprint recognition system has been presented. To evaluate the performance of the proposed methods and system, extensive experiments have been carried out on a set of 1200 dpi fragmentary fingerprint images with comparison to state-of-the-art minutiae based and orientation field based alignment methods. The experimental results demonstrate that the proposed methods can more accurately extract pore features and detect corresponding feature points on fingerprint fragments and recover the alignment transformation between them. It has also been shown in the experiments that the accuracy of fragmentary fingerprint recognition can be significantly improved by using the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A method for partial fingerprint recognition performed using a computer or a processor, the method comprising the steps of:
    extracting features including ridge orientations, valley images, minutiae, and pores from at least two fingerprint fragments;
    aligning the fingerprint fragments;
    matching the pores and minutiae on the fingerprint fragments after applying estimated alignment transformation;
    calculating a final matching score based on a pore matching score and a minutiae matching score; and
    identifying a person based on a result of the final matching score,
    wherein the extraction of the pores further comprising:
        dividing the fingerprint fragments into blocks;
        identifying two spatial filters for each of the blocks based on ridge frequencies in the block;
        using the spatial filters to generate block-wise image response;
        thresholding the block-wise image response and estimate a difference, which generates initial pore extraction results; and
        post-processing the initial pore extraction results to eliminate spurious pores.

2. The method according to claim 1, wherein the minutiae matching score is a ratio between number of matched pore to total number of pore, and the pore matching score is a ratio between number of matched minutiae to total number of minutiae.

3. The method according to claim 1, wherein the spatial filters are Gaussian filters.

4. The method according to claim 1, wherein the aligning of fingerprint fragments further comprising:
    detecting pore correspondences based on the ridge orientations and valley images of neighboring pores;
    checking the pore correspondences based on global geometrical relationship between the pores;
    estimating the alignment transformation between fingerprint fragments based on the detected pore correspondences.

5. The method according to claim 4, wherein if the fingerprint fragments cannot be aligned, it is determined that the fingerprint fragments are from different fingers.

6. A method for partial fingerprint recognition performed using a computer or a processor, the method comprising the steps of:
    extracting features including ridge orientations, valley images, minutiae, and pores from at least two fingerprint fragments;
    aligning the fingerprint fragments;
    matching the pores and minutiae on the fingerprint fragments after applying estimated alignment transformation;
    calculating a final matching score based on a pore matching score and a minutiae matching score; and
    identifying a person based on a result of the final matching,
    wherein the extraction of the pores further comprising:
        dividing fingerprint fragments into blocks and terminating partition from localized ridge-orientation inconsistency information in the block;
        defining a local model for each of the blocks which is used as a matched filter to filter the block;
        thresholding filtered outputs to obtain initial pore extraction results; and
        post-processing the initial pore extraction results to remove spurious pores.

7. The method according to claim 6, wherein the minutiae matching score is a ratio between number of matched pore to total number of pore, and the pore matching score is a ratio between number of matched minutiae to total number of minutiae.

8. The method according to claim 6, wherein the spatial filters are Gaussian filters.

9. The method according to claim 6, wherein the aligning of fingerprint fragments further comprising:
    detecting pore correspondences based on the ridge orientations and valley images of neighboring pores;
    checking the pore correspondences based on global geometrical relationship between the pores;
    estimating the alignment transformation between fingerprint fragments based on the detected pore correspondences.

10. The method according to claim 9, wherein if the fingerprint fragments cannot be aligned, it is determined that the fingerprint fragments are from different fingers.

* * * * *